United States Patent
Arnold et al.

(10) Patent No.: US 10,784,687 B2
(45) Date of Patent: *Sep. 22, 2020

(54) METHOD FOR CONTROLLING A MULTIVALENT ENERGY SUPPLY INSTALLATION

(71) Applicant: Viessmann Werke GmbH & Co. KG, Allendorf (DE)

(72) Inventors: Christian Arnold, Neuhof-Rommerz (DE); Martin Bock, Frankenau (DE); Andrej Grad, Bromskirchen (DE); Tobias Maurer, Allendorf (DE); Reinhard Osterloh, Winterberg (DE); Jörg Timmermann, Battenberg (DE)

(73) Assignee: Viessmann Werke GmbH & Co. KG, Allendorf (DE)

( * ) Notice: Subject to any disclaimer, the term of this patent is extended or adjusted under 35 U.S.C. 154(b) by 63 days.

This patent is subject to a terminal disclaimer.

(21) Appl. No.: 16/087,658

(22) PCT Filed: Mar. 23, 2017

(86) PCT No.: PCT/EP2017/056925
§ 371 (c)(1),
(2) Date: Sep. 23, 2018

(87) PCT Pub. No.: WO2017/162792
PCT Pub. Date: Sep. 28, 2017

(65) Prior Publication Data
US 2019/0109460 A1    Apr. 11, 2019

(30) Foreign Application Priority Data
Mar. 24, 2016    (DE) .................. 10 2016 205 035

(51) Int. Cl.
*G05B 19/00*    (2006.01)
*H02J 3/38*    (2006.01)
(Continued)

(52) U.S. Cl.
CPC .............. *H02J 3/381* (2013.01); *F01K 13/02* (2013.01); *G06Q 50/06* (2013.01); *H02J 2300/30* (2020.01)

(58) Field of Classification Search
None
See application file for complete search history.

(56) References Cited

U.S. PATENT DOCUMENTS

| 2005/0096872 A1 | 5/2005 | Blevens et al. |
| 2007/0038321 A1 | 2/2007 | McDonald et al. |

(Continued)

FOREIGN PATENT DOCUMENTS

| DE | 10348563 A1 | 5/2004 |
| DE | 202006001553 U1 | 8/2006 |

(Continued)

OTHER PUBLICATIONS

International Search Report dated Jun. 23, 2017 for PCT App. Ser. No. PCT/EP2017/056925.

*Primary Examiner* — Paul B Yanchus, III
(74) *Attorney, Agent, or Firm* — Henricks Slavin LLP

(57) ABSTRACT

The present invention relates to a method of controlling a multivalent energy supply system, wherein the multivalent energy supply system comprises at least two energy generators which use at least two different energy carriers to provide energy in the form of heat and/or cold and/or electrical energy. The energy supply system comprises, for each energy generator, a closed-loop controller for controlling controlled variables of the energy generator and a control device for coordinatedly controlling the closed-loop controllers. The control device detects at least one energy supply request for at least one energy form of heat and/or cold and/or electrical energy and determines a classification of the energy generator into groups according to a specific characteristic of the energy generators, each energy genera- (Continued)

tor being assigned to exactly one group for each energy form that it provides. For each energy generator, the control device determines target values for meeting the at least one energy supply request depending on the classification of the energy generators into groups and outputs the target values to the closed-loop controllers.

9 Claims, 8 Drawing Sheets

(51) Int. Cl.
*G06Q 50/06* (2012.01)
*F01K 13/02* (2006.01)

(56) References Cited

U.S. PATENT DOCUMENTS

| | | |
|---|---|---|
| 2007/0233286 A1 | 10/2007 | Ishikawa et al. |
| 2011/0012427 A1 | 1/2011 | Craig et al. |
| 2011/0071690 A1 | 3/2011 | Sun et al. |
| 2013/0140885 A1 | 6/2013 | Craig et al. |
| 2015/0316902 A1* | 11/2015 | Wenzel .............. G05B 15/02 700/291 |
| 2017/0031962 A1* | 2/2017 | Turney .............. G05B 15/02 |

FOREIGN PATENT DOCUMENTS

| | | |
|---|---|---|
| DE | 102008000392 A1 | 10/2008 |
| DE | 102008063954 B3 | 7/2010 |
| DE | 102010009081 A1 | 8/2011 |
| EP | 1202425 A2 | 5/2002 |
| EP | 1202425 A3 | 3/2005 |
| EP | 2144130 A1 | 1/2010 |
| EP | 2187136 A2 | 5/2010 |
| RU | 2449447 C2 | 4/2012 |
| WO | WO 2008/091970 A2 | 7/2008 |
| WO | WO 2009/141176 A1 | 11/2009 |

* cited by examiner

Prior art

E1 on/off

E2 on/off

E3 on/off

E4 on/off

METHOD FOR CONTROLLING A MULTIVALENT ENERGY SUPPLY INSTALLATION

The present invention relates to a method of controlling a multivalent energy supply system comprising at least two energy generators which use at least two different energy carriers to provide energy in the form of heat and/or cold and/or electrical energy. The invention further relates to a control device for controlling a multivalent energy supply system.

A method of operating a system comprising a plurality of heat generating means is known, for example, from EP 2187136 A2. The system may provide heat power using a plurality of heat generating means, wherein the allocation of the heat power to the individual heat generating means is variable so that they can be operated close to their optimal efficiency. The allocation of power may not only be performed by means of a higher-level boiler management system, but also be carried out by coordinating the individual heat generating means with each other.

From the International Patent Application WO 2009/141176 A1, a mobile heating system is known which comprises a plurality of fuel-operated heating devices which are in communication with each other via a bus system. The heating system is configured such that, when starting the heating system, one of the heating devices is configured based on predetermined rules as a master with respect to the control of other heating devices connected to the bus system. The remaining heating devices are configured as slaves.

The European Patent Application EP 2144130 A1 discloses a group management system that can control a plurality of devices collectively and allows flexibly adding or changing device groups.

A hybrid heating system comprising at least one condensing boiler and at least one non-condensing boiler is known from the International Patent Application WO 2008/091970 A2. Switching on or off the individual boilers is carried out by a control after determining the heat load, inter alia, based on the flow in the main line of the heating system as well as other starting criteria. The selection of the boilers is carried out based on the ambient temperature and the operating hours of the individual boilers.

The object of the present invention is to provide a method for controlling a multivalent energy supply system, whereby an improved quality of control can be achieved compared to the prior art. The quality of control describes the behavior of a control. Here, a high (or good) quality of control means that a certain required target value may be achieved in a particularly short time. A low (or poor) quality of control means that a certain required target value will only be reached in a relatively long time. Thus, the present invention aims at improving the control of a multivalent energy supply system in such a way that the time to reach a certain predetermined target value or to meet an energy supply request is particularly low.

In conventional control methods for a plurality of energy generators of an energy supply system, the individual energy generators are sequentially switched on or off according to a predetermined order. Switching on the next energy generator in the order is performed whenever the current energy demand can no longer be met by the already switched-on energy generators. Accordingly, energy generators are switched off when the amount of energy provided exceeds the demand requested. Here, it can happen that switching on a subsequent energy generator in the order is blocked by an energy generator which is switchable and/or controllable very slowly, so that a very long time may be necessary to meet a demand.

In a further known control method for a plurality of energy generators of an energy supply system, the individual energy generators are switched on and/or off and controlled independently of one another (in parallel). The control is thus completely uncoordinated. Restrictions or specific characteristics of individual energy generators cannot be taken into account for the control of the energy supply system.

The control method according to the invention aims at combining the advantages of a sequential control with those of a parallel control of energy generators. For this purpose, the energy generators are divided into groups, wherein a variable order of the energy generators is set within a group. Furthermore, an order of groups called a cascade may be defined, with a cascade comprising one or more groups. Individual cascades may be controlled in parallel. This ensures that a plurality of orders which are controllable in parallel to each other may be defined. As a result, the control of a multivalent energy supply system may respond particularly well to changing conditions. Furthermore, different specific characteristics of the energy generator may be combined with each other particularly well and switching on and/or off the energy generators may be coordinated particularly well.

By classifying the energy generators of a multivalent energy supply system into groups, it can be achieved that the energy generators can be operated very uniformly. As a result, a particularly smooth operation and a high durability of the energy generators are made possible. By classifying the energy generators into groups according to the invention which may be performed dependent on the energy carriers used by the energy generators, the operation of the multivalent energy supply system may become more independent of the availability of different energy carriers, since a fluctuating availability of an energy carrier can be compensated by a further energy carrier.

The object is achieved by specifying a method of controlling a multivalent energy supply system comprising at least two energy generators which use at least two different energy carriers to provide energy in the form of heat and/or cold and/or electrical energy. Each energy generator comprises a closed-loop controller for controlling controlled variables of the energy generator. The multivalent energy supply system further comprises a control device coordinatedly controlling the closed-loop controllers.

According to the invention, the control device detects at least one energy supply request for at least one energy form of heat and/or cold and/or electrical energy. Further, the control device determines a classification of the energy generators into groups according to a specific characteristic of the energy generators, each energy generator being assigned to exactly one group for each energy form that it provides. Each energy generator is thus assigned to at least one group. For each energy form, an energy generator can be assigned to at most one group, however.

The control device determines, for each energy generator, target values for meeting the at least one energy supply request based on the classification of the energy generators into groups and outputs the target values to the closed-loop controllers. An energy supply request may be either given to the control device from outside or may be generated by the control device itself In the context of the invention, an energy generator is "switched on" if the power provided by the energy generator energy exceeds a predetermined power threshold. Thus, for "switching on" an energy generator, the power provided by the energy generator is increased until the power provided by the energy generator is greater than the predetermined power threshold.

According to the invention an energy generator, is "switched off" if the power provided by the energy generator falls below a predetermined power threshold. For "switching off" of an energy generator, the power provided by the energy generator is decreased until the energy provided by the energy generator is less than the predetermined power threshold.

Coordinated control of the closed-loop controllers means that the control device takes into account the totality of the energy generators in the energy supply system when determining the target values. In the presence of a plurality of energy supply requests for different energy forms, this may involve taking into account which energy generator can provide which energy form(s). Further, it may be necessary for the controller to determine if multiple energy generators are required to meet the energy supply request(s). When selecting the energy generators to meet the energy supply request(s), the controller may also take into account how much time the different energy generators require to reach a particular target value and/or if restrictions on the availability of an energy carrier utilized by the energy generators are present.

In order to allow a coordinated control of the closed-loop controllers, the control device may be configured to detect a plurality of specific characteristics of the energy generators and, if appropriate, to compare them to one another and/or to recognize and take into account dependencies between the energy generators. In particular, specific characteristics with regard to the power output of the energy generator can be taken into account in the control of the energy supply system. Specific power output characteristics include, among other things, a maximum power that can be provided by the energy generator and the time it takes for the energy generator to transition from a switched off operating condition to an optimal operating condition.

By classifying the energy generators into groups, the quality of control of the multivalent energy supply system may be improved. In addition, the classification into groups may simplify the control and/or the configuration of very complex multivalent energy supply system. Furthermore, a particularly economical operation of a multivalent energy supply system is made possible, since specific characteristics of the respective energy carriers used may also be taken into account.

The object is also achieved by providing a control device for controlling a multivalent energy supply system comprising at least two energy generators which use at least two different energy carriers to provide energy in the form of heat and/or cold and/or electrical energy. Each energy generator comprises a closed-loop controller for controlling controlled variables of the energy generator. According to the invention, the control device detects at least one energy supply request for at least one energy form of heat and/or cold and/or electrical energy. Further, the control device determines a classification of the energy generators into groups according to a specific characteristic of the energy generators, each energy generator being assigned to exactly one group. The control device determines, for each energy generator, target values for meeting the at least one energy supply request based on the classification of the energy generators into groups and outputs the target values to the closed-loop controllers.

Controlling multivalent energy supply systems can be very complex and typically requires a customized solution tailored to the actual system configuration, such as a programmable logic controller. Depending on the complexity of the multivalent energy supply system, the development effort and the associated costs for providing a system control can be very high. In addition, when installing a multivalent energy system, the configuration of a corresponding control can be very complicated and time-consuming. Therefore, it is an object of the invention to provide methods which allow optimal control of a multitude of different multivalent energy supply systems with different infrastructures and/or different components. Additionally, a control device is to be provided which is able to optimally control a plurality of different multivalent energy supply systems.

A multivalent energy supply system is an energy supply system which uses more than one energy carriers its energy source. It comprises at least two energy generators, each of which provides at least one usable energy form, such as, for example, heat, cold, mechanical energy and/or electrical energy. Heat can be provided, for example, for a hot water supply and/or a heating system and/or as process heat, for example for industrial applications. For transporting the heat, a fluid carrier medium, i.e., a gas or a liquid, is usually used, for example water or steam.

In order to optimally operate a multivalent energy supply system, the control of the energy supply system must be carried out depending on the specific characteristics of the energy generators which depend inter alia on the type of energy carrier used. The present invention aims at synergistically combining these specific characteristics. In other words, the method according to the invention makes it possible to combine the respective advantages of the different energy carriers optimally. This is achieved by a coordinated control of the energy generators, so that from the multivalence of the energy supply system an additional advantage can be obtained.

In particular, a multivalent energy supply system may use a combination of regenerative and fossil energy carriers, so that at the same time a particularly reliable operation of the energy supply system can be achieved, since a fluctuating availability of an energy carrier can be compensated by the use of at least one further energy carrier. In this way, the method according to the invention allows for the control of the energy supply system to react to changing conditions.

The at least two energy generators of the multivalent energy supply system use at least two different energy carriers in total. As energy carriers, fossil and/or regenerative energy carriers may be used. For example, two or more of the following may be used: coal, natural gas, heating oil, diesel, gasoline, hydrogen, biogas, wood (for example in the form of pellets and/or wood chips) or other types of biomass, geothermal energy, solar radiation, wind, electrical energy (for example, electric current and/or electric voltage), long-distance heating, mechanical energy (for example, hydropower). By using different energy carriers, the reliability of the energy supply may be improved, for example, by reducing the dependence on the availability of an energy carrier (such as the sun and/or wind).

The multivalent energy supply system according to the invention comprises at least two energy generators, each of which uses at least one of the aforementioned energy carriers to provide energy in the form of heat, cold and/or electrical energy. For example, two or more energy generators from the following list which is a non-exhaustive listing, are used: oil-fired boiler, gas-fired boiler, calorific-value boiler condensing boiler, gas engine, gas turbine, combined heat and power plant (CHP), wood boiler, electric heat pump, photovoltaic system, wind turbine, solar thermal collector, fuel cell. In addition, a combined heat an energy generation may, for example, be implemented with a Stirling engine. Furthermore, a buffer storage may also be considered an energy generator The various energy generators may have very different specific characteristics and may accordingly have different or even conflicting requirements during their operation in a multivalent energy supply system. In the following, typical specific characteristics of selected energy generators are described by way of example.

An oil-fired boiler or gas-fired boiler uses the fossil energy sources heating oil or natural gas and provides heat which is usually transferred to a fluid carrier medium, typically water. It can supply large power outputs within a short time and can be switched off quickly. Such a boiler may be easy to control. Additionally, it may have particularly high control dynamics and may therefore be used in modulating operation. A boiler also allows frequent switch-on/off operations and may therefore also be used in two stages in on/off operation. Oil-fired boilers and gas-fired boilers are thus particularly flexible in their operation and are often used as so-called peak-load boilers which are to respond quickly to fluctuations in energy supply requests. The overall energy costs which take into account the costs of the energy carrier itself, as well as maintenance costs and the investment costs of the boiler, are at a medium level compared to other energy generators. Oil-fired boilers and gas-fired boilers may each be configured as condensing boilers or calorific-value boilers A combined heat and power plant (CHP) usually uses fossil energy sources, but could also operate on biogas or hydrogen derived from renewable sources. It supplies heat and electrical energy (e.g., electric current and/or electric voltage), is easy to control and can quickly be ramped up to high power output and quickly shut down again. Unlike the boiler, however, the CHP should not be switched on or off frequently. In order to operate a CHP economically, it is usually used in continuous operation. Despite the high investment costs, the combined heat and power plant as a whole therefore has relatively low overall energy costs.

A wood boiler uses solid fuel from a renewable energy source (wood, for example in the form of pellets or wood chips) and provides heat. It is only moderately controllable and can only relatively slowly be ramped up to high power output or shut down again. Due to the long switching times, a wood boiler should not be switched on or off frequently. When switching off, for safety reasons it is usually necessary to wait until the fuel already in the combustion chamber is completely burnt. When switching on, however, first sufficient fuel must be transported into the combustion chamber and ignited. It causes relatively low overall energy costs. Therefore, it is usually used as a base load boiler which is as kept in continuous operation if possible and can meet a minimum energy demand of an energy supply system. In order to be able to react to fluctuations in the demanded amount of energy, a wood boiler is usually used in combination with a buffer storage which intermediately stores the heat provided by the wood boiler when the amount of heat demanded by the consumers is less than the amount of heat provided by the wood boiler. If the amount of heat demanded by the consumers is greater than the amount of heat provided by the wood boiler, first the amount of heat stored may be released from the buffer storage again. Alternatively or in addition to the buffer storage, a gas boiler is often used together with wood boilers in an energy supply system. The gas boiler is then turned on when the demanded amount of heat exceeds the amount of heat available from the wood boiler and from the buffer storage. The gas boiler is therefore used as a peak load boiler. Usually, wood boilers are operated in pairs so that at least one of the two wood boilers is always ready for operation.

An electric heat pump consumes electrical energy and therefore uses fossil and/or regenerative energy sources depending on which source the electrical energy was derived from. It can provide heat and/or cold, but has a limited temperature range. Usually, a heat pump can provide a maximum flow temperature of 60° C. It is easy to control and can quickly be ramped up to high power output and can also be quickly shut down again. However, it may not be switched on or off frequently. It causes relatively low overall energy costs.

Another component that is used in many multivalent energy supply systems is a buffer storage. The buffer storage may intermediately store energy provided by energy generators. Depending on the energy form, a buffer storage may be, for example, a storage for electrical energy, for example in the form of batteries or capacitors, or a heat storage and/or cold storage, for example in the form of an insulated water tank. In addition, energy can also be stored in the form of mechanical energy, for example in a flywheel. A buffer storage allows at least partial decoupling of the operation of the energy generators from the energy consumers. As a result, the efficiency of a multivalent energy supply system may be improved. A buffer storage may also be viewed as an energy generator in the control of an energy supply system.

According to the invention, the multivalent energy supply system may be configured to provide energy in the form of heat, cold and/or electrical energy. For each energy form, at least one energy supply request may be present. Energy supply requests for each energy form may be detected independently of each other by the control device and may further be processed into corresponding target value requests to energy generators. For example, an energy supply request may come from a consumer, a plurality of consumers, or an external or internal device that coordinates requests from a plurality of consumers. For each energy form, it is also possible to define criteria for energy generators that are assigned to the corresponding energy form.

Furthermore, there may be more than one energy supply request for an energy form. For this purpose, one or more energy forms may be categorized, for example, based on the connection of the energy generator and/or types of consumers present in the consumer circuits. This may serve, for example, to supply the (physical) energy form of heat to different consumer circuits with different requirements. Here, the energy generators affected by the energy supply request may also be connected to separate consumer circuits. Alternatively, it is possible to switch between different consumer circuits by means of valves, throttles and/or switches.

For the energy form of heat, for example, different energy supply requests may be present if different flow temperatures are requested for the hot water supply (drinking water) and heating and/or process heat (service water or steam).

The classification into the energy forms of heat, cold and electrical energy may also be supplemented by other energy forms. Furthermore, an energy form may also be subdivided depending on usage. For example, the energy form of heat may be subdivided into hot water, thermal heat and/or hot air. The energy form of cold may be subdivided, for example, into a building cooling system (for example, an air conditioning system with fresh air supply) and a device cooling system (for example, a coolant for cooling machines).

Since there may be energy generators in the multivalent energy supply system which can simultaneously provide more than one energy form, it may be necessary to determine under which conditions such energy generators should be switched on and/or off and/or be regulated or controlled. The control device may prioritize certain energy forms in the control of the energy generator, so that an energy supply request for a first energy form are preferably treated over an energy supply request for a second energy form. For example, the priority order may be set manually by a user. The control device may thus detect and process energy supply requests dependent on the respective energy form.

For example, a CHP supplies both heat and electrical energy (electric current and/or electric voltage). Consequently, two different requests from the two energy forms may be present for a CHP. However, since the electrical energy supplied by the CHP can be fed into a public power grid at any time in the absence of a corresponding request of the consumers supplied by the multivalent energy supply system, the CHP is usually used in continuous operation.

The energy form of heat includes all energy generators that can provide heat energy. In addition control device takes into account conditions for switching on and/or switching off for the energy form which are related to an energy supply request of heat, for example, a requested system flow temperature and/or a buffer temperature. Similarly, energy generators are assigned to the energy forms of electrical energy and cold.

In particular, an energy generator may provide more than one energy form and thus may also be associated with more than one energy form. If there are energy supply requirements for more than one energy form which could relate to the same energy generator, the control device decides which request should be given priority for the respective energy generator. Thereby it can be avoided that a request from one energy form results in an energy generator being switched off, although another energy form generates a request to operate the energy generator.

Each energy generator in the energy supply system includes a closed-loop controller for controlling controlled variables of the energy generator. Controlled variables of an energy generator include, for example, a boiler temperature of the energy generator, a volume and/or mass flow of a carrier medium through the energy generator, a temperature of the carrier medium in the flow and/or the return flow of the energy generator, a power consumption of the energy generator and/or a power output of the energy generator. In an energy generator that provides electrical energy, the controlled variables may relate to an electrical current, an electrical power and/or an electrical voltage.

The closed-loop controllers are coordinated by a control device which is superordinate to the closed-loop controllers. The control device is configured to detect an energy supply request for energy in the form of heat and/or cold and/or electrical energy. An energy supply request may be, for example, a request for a certain flow temperature or a certain temperature in a buffer storage, in particular in a certain area of the buffer storage, or be an electric power. For example, the energy supply request may be generated by a consumer or a group of consumers and be output to the control device via an appropriate data communication link.

The controller is further configured to determine, for each of the energy generators, target values for meeting the energy supply request depending on the particular energy carrier being used, the target values also including instructions for switching on or off an energy generator.

The control device is further configured to output the target values to the closed-loop controllers. For communicating with the closed-loop controllers, the control device uses a suitable data communication link.

The various energy carriers used in the energy supply system may put requirements on the energy supply system, for example due to different costs and/or fluctuating availability. In order to ensure an uninterrupted operation of the energy supply system if possible, the control device determines the target values for the energy generators, for example, based on the current and/or also precalculated, predetermined or estimated availability of the utilized energy carriers.

For example, the control device may be configured to operate preferred energy generators which use, for example, particularly cost-effective and/or regenerative energy carriers at high or maximum power. Non-preferred energy generators which use, for example, less cost-effective and/or fossil energy carriers and which are provided to cover the peak loads should not be used to store heat in a buffer storage. Preferred energy generators are allowed to use the buffer storage to realize longer run times or fewer switching operations.

The control device according to the invention of a multivalent energy supply system may predetermine target values for the closed-loop controllers of the energy generator and/or issue switching requests. In addition to the switching requests which determine whether an energy generator must be switched on or off, the control device may also issue releases which allow, but not enforce, switching on or off an energy generator.

Switching energy generators on and off by the controller in a purposeful manner alone would not be sufficient to meet the energy supply request, because the switching alone does not define at what modulation level or at what temperature level the released energy generator is to operate. Therefore, target value specifications by the control device are required.

The different controlled variables of an energy supply system (for example, system flow temperature, and buffer temperature) require individual target value specifications to the individual energy generators. In addition, boundary conditions should also be taken into account. These boundary conditions may include, for example, control strategies, predetermined preferred energy generators and/or buffer dynamics.

The selective release of energy generators is not sufficient, for example, to control a system flow temperature and/or a buffer temperature to reach a desired level with a required power. This is because it is not defined by the release which power at which temperature level each approved energy generator should provide. Therefore, additional target value specifications are required. In a multivalent energy supply system, different energy generators with individual generator-specific restrictions (for example, minimum and maximum values of the power, the volume flow or the runtimes) may be represented. In addition, the extensive configuration options allow energy generators to work at different controlled variables (e.g., system flow temperature, buffer state of charge). These circumstances require that each energy generator receives individual target values in addition to the release or switch request.

Preferably, each closed-loop controller of each energy generator has an interface to receive target values from the control device. The closed-loop controllers act on the energy generator via suitable actuators in order to regulate the controlled variables to the corresponding desired value. The controlled variables include, for example: an (electric and/or heating and/or cooling) power that the energy generator introduces into the energy supply system, a volume or mass flow (or electric current) from the energy generator into the energy supply system, an energy generator flow temperature (an electric voltage).

The control device cannot act directly on these controlled variables, but merely outputs target values to a closed-loop controller. The regulation of the controlled variables to the nominal values remains the responsibility of the closed-loop controllers. Instead of a fixed target value, the control device may also specify an operating range (by an upper and lower restriction or a threshold value, respectively) to a closed-loop controller in which the controlled variables can be set by the closed-loop controller. An operating range defined by the control device may accordingly be defined by one or more target values which define minimum and/or maximum values for the controlled variables. Controlled variables are, for example:

A maximum thermal or electrical power (or heating power, cooling power) of the energy generator which must not be exceeded. The requirement is, for example, a percentage in relation to the physically possible maximum power of the respective energy generator.

A minimum thermal or electrical power (or heating power, cooling power) of the energy generator which the power may not fall below. The requirement is, for example, a percentage in relation to the physically possible maximum power of the respective energy generator.

A maximum volume flow (or mass flow or electric current) of the energy generator flowing from or through the energy generator into the energy supply system. The requirement is, for example, a percentage in relation to the maximum flow physically possible of the respective energy generator.

A minimum volume flow (or mass flow or electric current) of the energy generator flowing from or through the energy generator into the energy supply system. The requirement is, for example, a percentage in relation to the maximum flow physically possible of the respective energy generator.

A (minimum and/or maximum) energy generator flow target temperature or electric voltage. The requirement is in degrees Celsius or Volt. The specific values that the control device sends to the closed-loop controllers of the energy generator are also referred to as target values below.

Advantageous embodiments and developments which may be used individually or in combination with each other, are the subject of the dependent claims.

Preferably, the groups of energy generators are classified into cascades. The classification may be done depending on at least one of the group-specific characteristics of the energy generators. Each group is assigned to exactly one cascade. If a cascade comprises more than one group, a sequential order of the groups in the cascade is defined.

A cascade is a level of classification of the energy generators superordinate to groups. A cascade defines a sequential order of the energy generators included therein, respectively. Cascades are independently controllable, however. Thus, multiple sequential orders of energy generators executable in parallel may be defined, for each of which different criteria for switching on and/or off may be set.

The classification of the groups into groups may be carried out, for example, based on dynamic characteristics of the energy generators and/or based on a physical arrangement, for example a hydraulic connection, of the energy generators in the multivalent energy supply system. Thereby it can be ensured that energy generators that need a lot of time to reach an optimal operating state, are in operation as permanently as possible, and energy generators that require little time to reach an optimal operating state or to turn off are switched on only during the peak loads.

If a cascade comprises more than one group, an order of the groups within the cascade may be specified. The determination of the order may, in turn, be carried out depending on specific characteristics of the energy generators or depending on a characteristic which is common to the energy generators of a group. For example, a classification of the energy generators into groups according to the energy carriers used respectively. The ordering of the groups in a cascade can then take place, for example, depending on availability or cost of the energy carriers. This can ensure that cost-efficient energy carriers are preferably used. At the same time, runtime differences between similar energy generators within a group may be balanced.

The order of the groups within a cascade may be static. The order of the groups within a cascade is therefore preferably determined by characteristics of the energy generators that do not change over time, such as the type of energy carrier used. The order of the energy generators within a group may be variable. The order of the energy generators within a group is therefore preferably determined by characteristics of the energy generators that change over time, such as the runtime of the energy generator (operating hours) and/or the remaining time until the next maintenance or the elapsed time since the last maintenance.

In each group, a sequence of energy generators is defined, wherein the sequence may be variable depending on controlled variables of the energy generators. When changing the order of energy generators within a group, the energy generators are shifted to a different position in the order. Thus, for example, a runtime equalization between several energy generators of a group may be realized. Furthermore, there may also be position-specific switching criteria within a group. These position criteria are specific to a position of an energy generator in the order within a group. For example, the energy generator at the first position of a group may always remain switched on. Even if two energy generators exchange their positions within a group, for example after a fixed runtime, the position criterion of the predefined positions is maintained.

The order of switching on and/or off energy generators within a cascade may be determined depending on an order of the groups and the sequences within the groups.

Within each cascade, it may be decided independently of the other cascades whether and according to which criteria energy generators should be switched on and/or off in the order. Therefore, a variety of criteria may be set for each cascade which define, for example, thresholds depending on energy supply requests.

The cascades may be executed in parallel and indecently of each other by the control device. This means that, for example, switching on or off a first energy generator in a first cascade may take place independently of switching on or off a second energy generator in a second cascade. As a result, the quality of control may be significantly improved compared to methods in which only a single linear sequence of energy generators is defined. In addition, by executing the cascades in parallel instead of using a sequential order, it is possible to prevent the switching sequence from getting stuck at an energy generator in which a switching operation is prevented by a criterion with higher priority.

In a preferred method, at least one of the energy generators is used to meet a minimum energy request. The minimum energy request is also called the base load. An energy generator which provides a base load may, for example, be operated in a non-modulating manner and, in particular, may achieve a very long continuous runtime. For this purpose, the energy generator is preferably always operated at its maximum power at which the energy generator reaches its maximum efficiency. The energy generator for meeting the minimum energy request may be selected, for example, based on economic criteria (for example, price of the energy carrier). Typically, CHPs and/or wood boilers are used to provide a base load. To provide a minimum energy request of electrical energy CHPs may also be used. Alternatively, photovoltaic systems or wind turbines may be used in which the power provided may vary greatly depending on the weather, so that a buffer storage and/or power from a public power grid may be necessary to compensate for the fluctuations. For supplying a base load, a separate cascade may be provided.

In another preferred method, at least one energy generator is used to meet a maximum energy request. The maximum energy request is also called peak load. For this example, an energy generator controllable in a particularly fast manner may be determined. When classifying energy generators into cascades, the energy generator for meeting a maximum power request may be classified into a separate cascade controllable autonomously and/or in parallel to other cascades, so that the energy generator may be switched on at any time regardless of criteria of other cascades in order to meet an energy supply request. For supplying a peak load, a separate cascade may be provided.

The control device may preferably detect, from each of the closed-loop controllers, restrictions with respect to the controlled variables of the respective energy generator, wherein the restrictions relate to minimum and/or maximum values and/or indicate whether the respective energy generator must be switched on or off.

These restrictions may be generator-specific restrictions. As a restriction, for example, a minimum value and/or a maximum value may be specified which may be equal in magnitude. In this way, an operating point may be set for the energy generator at which an energy generator is to be operated. Such an operating point can ensure, for example, a particularly efficient operation of the energy generator. By detecting the restrictions, it can be ensured that the control device takes into account specifications by the energy generators in a coordinated manner when determining the target values for meeting the energy supply requests. In particular, it can be avoided that the control device determines a target value for an energy generator which cannot meet this target value due to its specific restrictions.

In addition, the control device may be configured to detect, from each of the closed-loop controllers, specific characteristics of the respective energy generator which indicate how an energy generator reacts to a change in the controlled variable. Such specific characteristics may represent a characteristic curve of an energy generator, indicating, for example, what power the energy generator outputs when a particular controlled variable is set.

The specific characteristics may relate, in particular, to dynamic characteristics of the energy generator. For example, they may describe how much time an energy generator needs to ramp up to full load or how long it takes to switch off the energy generator. In this way it can be ensured that, irrespective of which energy generator in the group is activated first, an energy generator with a similar dynamic characteristic is available at any time A specific characteristic of an energy generator may also depend on a hydraulic connection of the energy generator in the energy supply system. It can thus be achieved that energy generators are grouped in accordance with their physical arrangement in the energy supply system. In this way, for example, the fulfillment of a request for a certain flow temperature may be simplified.

A specific characteristic of an energy generator according to the invention may also be the energy form(s) provided by it. In addition, the specific characteristic may be the energy carrier used by the energy generator and/or may depend on the type of energy carrier used.

The control device may also be configured to determine an order of switching on and/or off the energy generators, in particular within a cascade or a group, based on the restrictions and/or the specific characteristics of the energy generators. In addition, the control device may be configured to determine target values for each energy generator for meeting the energy supply request depending on the order of switching on and/or off.

In a preferred method, the control device may detect if there is an energy supply request for providing heat and electrical energy present. If so, the control device determines whether one of the energy generators can provide heat and electrical energy. If so, the control device determines target values for the energy generator for providing heat and electrical energy based on the energy supply request. Alternatively, the control device may select at least two energy generators such that at least one of the energy generators provides heat and at least one other energy generator provides electrical energy.

A preferred method determines if a group has more than one energy generator, and if so, the controlled variables of the energy generators of the group describing a current operating state and/or history of operating states are detected. Furthermore, an order of the energy generators within the group is determined in accordance with the detected controlled variables and/or a ratio of the controlled variables. The control of the energy generators by the control device then is performed depending on the determined order of the energy generators within the group.

As a result of these method steps, runtime equalization, in particular between similar energy generators which are assigned to the same group, may be carried out. The runtime can be regarded as a current or historical development of an operating state. This may include, for example, a number of past maintenance intervals, an elapsed time since a last maintenance interval or the remaining time until the next maintenance interval.

Furthermore, the method may include that an order of the groups of energy generators is determined based on at least one of the following characteristics of the energy generators: energy content or calorific value of the respective carrier medium, price of the respective carrier medium, time until reaching an optimal operating state of the energy generator, availability of the respective carrier medium, time until reaching the next maintenance interval. The energy generators are then controlled by the control device depending on the determined order of the groups.

The groups of energy generators may also be classified into cascades based on the dynamic characteristics of the energy generators. The control of the energy generators by the control device then is performed depending on the specified classification of the groups into cascades. The cascades can be executed independently and in parallel to each other. Thereby. It can be achieved that in a cascade a plurality of energy generators are switched on and off according to a fixed (but variable) order, wherein other energy generators belonging to a different cascade can be switched on independently of the order of the first cascade if needed. This can significantly improve, inter alia, the quality of control of the energy supply system.

As an alternative to the previously mentioned methods of determining or defining an order of switching on and/or off, such an order may also be determined manually by a user. This may also apply to the order of groups in a cascade or of energy generators within a group.

A dynamic characteristic of an energy generator may generally be considered to be the time derivative of a change in the state of the energy generator, for example the time required for the energy generator to start up from an off state to an optimal operating state, or vice versa. Furthermore, the dynamic characteristic may relate to a time that an energy generator needs to reach a specified target value or to achieve a certain target value change. For this purpose, the control device may comprise a storage medium on which characteristic curves of each of the energy generators are stored. Alternatively, the control device may determine the dynamic characteristics of the energy generator by measurement.

The specific characteristic of the energy generators may depend on the type of energy carrier used by the energy generator. In some cases, dynamic characteristics of an energy generator may also depend on the fuel used. As explained above, a wood boiler, for example, takes much more time to start up than a gas boiler. Other specific properties may be related to the availability or cost of the energy carrier. Moreover, the physical arrangement of an energy generator in a multivalent energy supply system may be used as a specific characteristic.

For example, an energy generator using the sun as an energy source cannot provide energy at night. A wind turbine cannot provide energy during a lull. In case of a heat pump, a minimum interval in which the heat pump may not be switched off or a period after a shutdown in which the heat pump may not switched on may be predetermined. All these and other specific characteristics may affect the operation of a multivalent energy supply system.

Preferably, the method may comprise a step of determining whether there is an energy supply request for more than one of the energy forms of heat, cold, or electrical energy. Then a classification of the cascades may be determined based on the energy form provided by the energy generators. The control of the energy generators then is performed by the control device based on the specified determined classification of the cascades into energy forms.

For each energy form, a separate classification of the energy generators into groups and/or cascades may be defined. The classification into groups and/or cascades may differ between the energy forms. Within an energy form, an energy generator is assigned to exactly one group, and a group is assigned to exactly one cascade within an energy form. An energy generator is thus assigned to exactly one cascade per energy form.

A preferred control device is configured to classify the groups of energy generators into cascades. The classification can be performed based on at least one characteristic specific to the group of energy generators, each group being assigned to exactly one cascade. If a cascade comprises more than one group, a sequential order of the groups in the cascade may be specified. For each energy generator, the control device determines target values for meeting the at least one energy supply request dependent on the determined classification of the groups into cascades. Here, the cascades are independently controllable by the control device.

BRIEF DESCRIPTION OF THE DRAWINGS

Further advantageous embodiments will be described in more detail below with reference to an embodiment shown in the drawings, to which the invention is not limited, however.

In the figures.

DETAILED DESCRIPTION OF EMBODIMENTS

Figure 1:
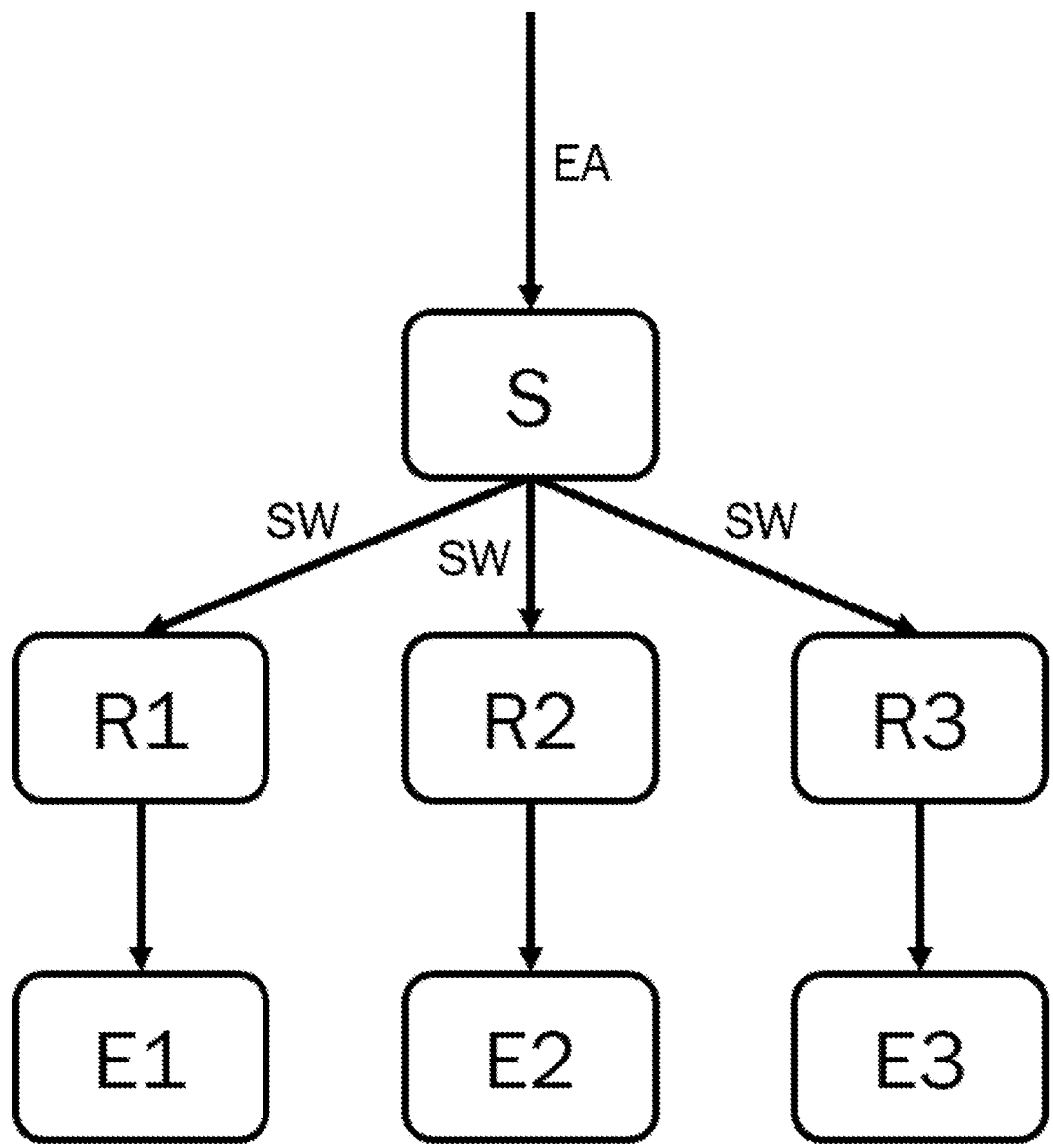
FIG. 1 shows a representation of control logic of a multivalent energy supply system according to a first embodiment.

In the following description of a preferred embodiment of the present invention, like reference characters designate like or similar components.

First Embodiment

FIG. 1 shows a schematic structure of a control device S for controlling a multivalent energy supply system according to a first embodiment. The control device S detects an energy supply request EA which can be generated, for example, by a plurality of consumers (not shown). The control device S determines target values for a plurality of energy generators $E1$-$E3$ of the multivalent energy supply system and outputs these to closed-loop controllers $R1$-$R3$ of the energy generators $E1$-$E3$.

Cascades

In the following, the classification of energy generators into energy forms, cascades and groups is described. The initial situation according to the prior art is illustrated by the examples shown in FIGS. 2 and 3. Here, four energy generators E1-E4 are shown.

Figures 2, 3:
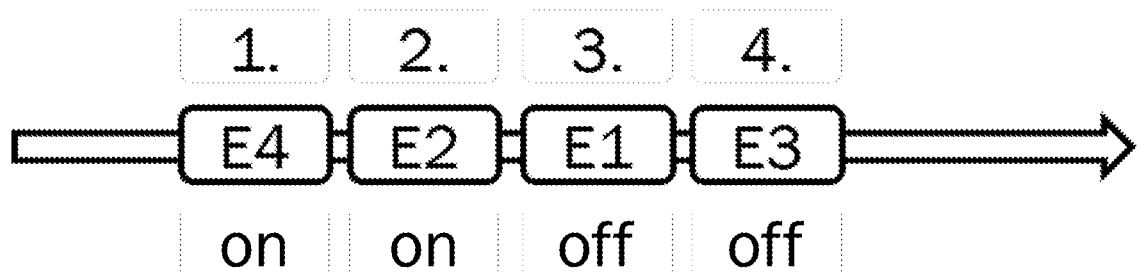
FIG. 2 is a parallel allocation of energy generators known in the prior art.
FIG. 3 is a sequential order for switching on or off energy generators known in the prior art.

FIG. 2 shows an example of a classification of energy generators according to the prior art. Each energy generator E1-E4 may be switched on and off according to its own criteria and they may also controlled independently of each other. A disadvantage of such a classification is that an order of switching can neither be set nor predicted. Also, simultaneously switching on or off some or all energy generators is possible here. Runtime equalization between energy generators cannot be realized in such a parallel classification.

FIG. 3 shows a sequential arrangement of the four energy generators E1-E4. The order of the energy generators E1-E4 may be either static or dynamic. Here, switching on takes place in the order from left to right and switching off in the reverse order from right to left. FIG. 3 shows a state in which the energy generators E4 and E2 at the first and second positions are already switched on. Next, the control device checks, for example based on a predetermined energy supply request, whether the energy generator E1 in third position should be switched on, If the result of the check is that E1 remains switched off, the check ends at this point and it is not checked whether the energy generator E3 in fourth position should be switched on. Switching on the energy generator E3 is thus blocked by the energy generator E1 in third position.

In a multivalent energy supply system comprising, for example, two wood boilers and a gas boiler (see fourth embodiment) with the two wooden boilers at first and second position and the gas boiler in third position, such an arrangement would be a disadvantage, since when wood boiler H2 in the second position is switched off switching on the gas boiler G1 in third position upon the occurrence of a short-term peak load would be prevented. More generally, in a multivalent power plant, a sluggish energy generator which takes a long time to start up may be skipped in the switching order, if necessary, in order to obtain a better quality of control.

The problems described above are solved by the method according to the invention. First, in a multivalent energy supply system, all energy generators are assigned to exactly one group. The grouping is carried out according to specific characteristics of the energy generator, so that similar or uniform energy generators are classified into one group. This can be done, for example, on the basis of the energy carrier used.

Second Embodiment

Figure 4:
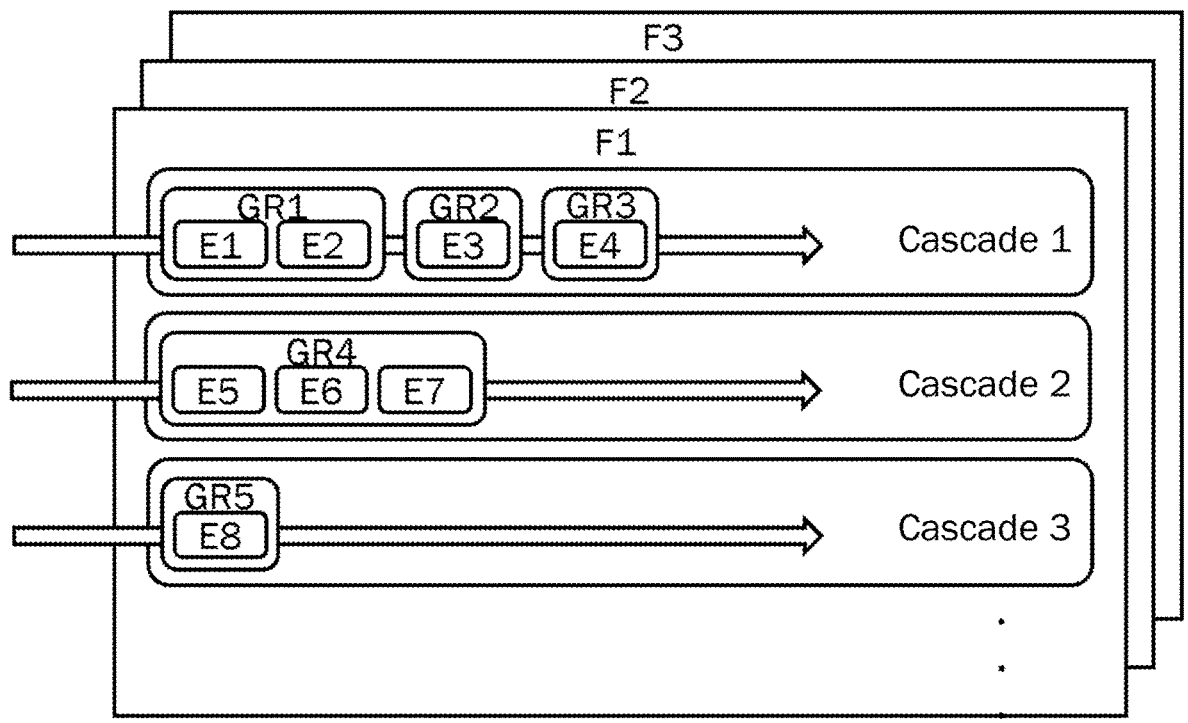
FIG. 4 shows an exemplary classification of eight energy generators into groups and cascades according to a second embodiment according to the invention.
Figure 12:
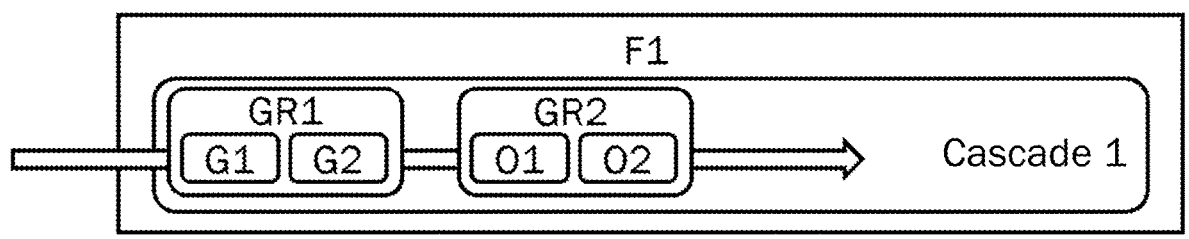
FIG. 12 shows a classification of the energy generators of the sixth embodiment into cascades and groups.

An exemplary assignment of eight energy generators E1-E8 is shown in FIG. 4. First, each of the energy generators E1-E8 is classified into groups according to specific characteristics so that each energy generator is in exactly one group. In the example of FIG. 12, this results in five groups GR1-GR5. The order of the energy generators within the groups is variable, so that, for example, runtime equalization among similar energy generators may be carried out.

Then the groups are assigned to cascades. Cascades may switch energy generators on and off independently of each other. In addition, cascades may be executed parallel to each other. In the example, the groups GR1-GR5 are classified into three cascades, all of which belong to a first energy form F1. In addition, individual energy generators may also provide other energy forms, so that they may be assigned to other energy forms F2-F3 during the classification into groups and cascades.

Within a cascade, the switch-on order goes from left to right, as indicated by the arrows. The switch-off order goes in the opposite direction from right to left. The order of the groups within a cascade may be static and may be dependent on other criteria. These criteria may be, for example, generator-specific or system-specific. For example, the order may depend on dynamic characteristics of the energy generators. Alternatively, the order may also depend on hydraulic relationships of the energy generators within the energy supply system.

Third Embodiment

Figure 5:
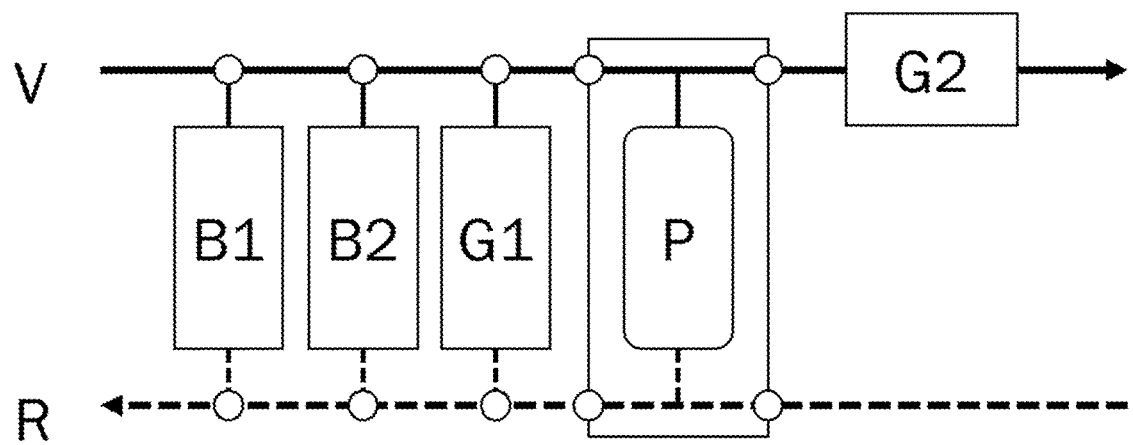
FIG. 5 is a hydraulic diagram of a multivalent energy supply system according to a third embodiment including two CHPs and two gas boilers.

FIG. 5 shows a schematic illustration of a third embodiment of a multivalent energy supply system for providing heat and electrical energy. FIG. 5 shows a hydraulic diagram (a schematic representation of the infrastructure) of the energy supply system, in which heat is released to a fluid carrier medium, for example water. The carrier medium transports the heat via a flow V to a consumer circuit (not shown). The flow is shown as a solid arrow which illustrates the flow direction of the carrier medium. In the consumer circuit, a plurality of consumers, for example, a plurality of radiators, may be arranged.

Via a return flow R, the carrier medium flows from the consumer circuit back to the energy supply system. The flow is shown as a dashed arrow illustrating the flow direction of the carrier medium. The carrier medium may be caused to flow, for example, by means of circulating pumps which may be arranged in the generator circuit, for example in the energy generators B1, B2, G1, G2, and/or in the consumer circuit. In addition, valves and/or throttles and/or sensors for measuring the flow and/or the temperature in the energy generators B1, B2, G1, G2 and/or in the flow V and/or in the return flow R may be arranged to in order to control or regulate a flow through the energy generators B1, B2, G1, G2.

The energy supply system comprises two combined heat and power plants (CHPs) B1, B2 and two gas boilers G1, G2, wherein the two CHPs B1, B2 are each arranged in parallel to each other between the flow V and the return flow R. Via the return flow R, the carrier medium coming from the consumer side flows to the energy generators which supply heat to the carrier medium. Via the flow V, the carrier medium flows to the consumer circuit (not shown).

A first gas boiler G1 is also arranged in parallel to the CHPs B1, B2 downstream in the flow V. Further downstream in the flow V, a buffer storage P is arranged in parallel to the first gas boiler G1 and the CHPs B1, B2. Downstream of the buffer storage P, a second gas boiler G2 is arranged in series in the flow V, so that the second gas boiler G2 may raise the flow temperature directly. Due to the arrangement of the second gas boiler G2 behind the buffer storage in the flow, it cannot influence the temperature of the water stored in the buffer storage.

The CHPs B1, B2 and the gas boilers G1, G2 each include a closed-loop controller R1-R4 for controlling controlled variables of the energy generators. A control device S is connected to the closed-loop controllers R1-R4 and may periodically fetch the set controlled variables and output target values SW to the closed-loop controllers R1-R4. The control logic is thus implemented similarly as shown in FIG. 1, but with four energy generators B1, B2, G1, G2.

The control device S of the energy supply system of the embodiment may be controlled according to specifications of a set operation mode. The first gas boiler G1 should only be used when both CHPs B1, B2 are already in operation and the heat provided by them in the flow V is insufficient to meet an energy supply request EA, for example in the form of a required temperature in the buffer storage P or a system flow temperature at the transition (to the right in the figure) to the consumer circuit. Here, the second gas boiler G2 should only be used when both CHPs B1, B2 and the first gas boiler G1 are already in operation and the heat provided is insufficient to meet the energy supply request.

Figure 6:
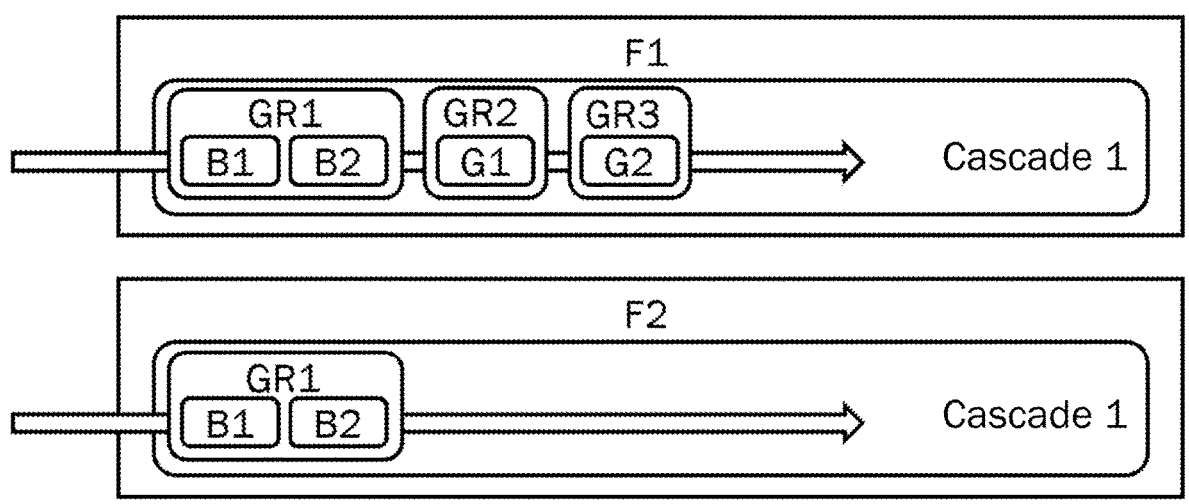
FIG. 6 shows a classification of the energy generators of the third embodiment into energy forms, cascades and groups.

It will now be explained with reference to FIG. 6 how an order of switching on or off in the multivalent energy supply system is determined. Since the multivalent energy supply system may provide both heat and electrical energy, two energy forms F1 (for heat) and F2 (for electrical energy) are provided.

Between the CHPs B1, B2, a runtime equalization is to take place. For this purpose, the two CHPs B1, B2 are assigned to a group GR1. Within the group, the CHPs B1, B2 may exchange their positions. One criterion for determining at which position a CHP should be placed in the group may be the runtime difference between the CHPs B1, B2. The runtime difference is thus a position-specific criterion. A criterion which is generator-specific, for example to the CHP B1, shifts with the exchange of positions and thus remains with the energy generator. In order to prevent a constant exchange of positions of the two CHPs B1, B2 within the group GR1, in addition, a minimum runtime difference may be set, from which on a runtime equalization may take place. The control unit records the runtimes of the CHPs and determines the order of the CHPs depending on the recorded runtimes.

The order in which the first gas boiler G1 and the second gas boiler G2 are switched on shall be fixed. There should be no runtime equalization between the gas boilers G1, G2. The reason for this may be, for example, that the first gas boiler G1 has a better degree of utilization (for example, a condensing boiler) than the second gas boiler G2 (for example, a low-temperature boiler). To achieve this, the two gas boilers G1, G2 are assigned to two separate groups GR2, GR3. The efficiency of gas boilers is an example of a specific characteristic of the energy generators.

The three groups GR1-GR3 of the first energy form F1 may be assigned to a common cascade 1. The order of the groups GR1, GR2, GR3 may be fixed or variable. In order for the CHPs B1, B2 to reach as many operating hours as possible, the group GR1 is placed first in the cascade 1. Since the gas boiler G1 is to be preferably operated over the gas boiler G2, the group GR2 with the gas boiler G1 is placed second in the cascade before the group GR3 including the gas boiler G2 1.

The control device also receives energy supply requests of a requested electrical power (e.g., as request for an electrical current and/or an electrical voltage). The CHPs B1, B2 may therefore be switched or regulated to meet the requirements for electrical energy in addition to an energy supply request for heat. Therefore, the CHPs B1, B2 are assigned to a second energy form F2 for electrical energy.

Energy supply requests for electrical energy and/or switching requests for energy generators that provide electrical energy are taken into account by the control device S. In this example, the CHPs would be operated to provide heat as follows.

The first CHP B1 in the first position within the group GR1 (this may also be the second CHP B2 depending on the runtime equalization) is switched on when a system flow temperature drops below a required system flow temperature. Here, the required system flow temperature is measured downstream of the second gas boiler G2 in the flow V. When a predetermined threshold value of the temperature in the buffer storage P which is measured at a layer located at the bottom in the buffer storage P is exceeded, the first CHP B1 is switched off.

The control of the second CHP B2 in the second position in the group GR1 is performed in a similar manner as that of the first CHP B1. If an undershooting of the required system flow temperature is detected in spite of CHP B1 being switched on, the control device S switches on the second CHP B2. When a predetermined threshold value of the temperature in the buffer storage P which is measured at a layer located in the center of the buffer storage P is exceeded, the control device S switches off the second CHP B2 again.

The gas boiler G1 is switched on when the CHPs B1 and B2 are switched on already and the system flow temperature falls below the required system flow temperature. Switching off the gas boiler G1 takes place when a threshold value of the temperature in the buffer storage P which is measured in an upper layer is exceeded.

If the first three energy generators in the cascade 1 of the energy form heat F1 are already in operation, but a system flow temperature is below the required system flow temperature is measured, the second gas boiler G2 is switched on. As soon as the required system flow temperature is exceeded, the control device S switches off the gas boiler G2 again.

In particular, the requirements from the energy form heat and from the energy form electrical energy are detected in a coordinated manner and further processed by the control device. This corresponds to finding a compromise between the requirements of the energy form heat and the energy form electrical energy. If the energy form heat would, for example, request switching off a CHP, the control device S would first check whether the energy form electrical energy continues to require the operation of the CHP before the release is withdrawn. For this purpose, the control device S may be configured to estimate the energy demand of the relevant energy form and to make the decision on the withdrawal of the release dependent on whether a continued operation of the CHP is required. By this method, the number of switch-on and switch-off operations may be minimized, whereby wear of the energy generator may be reduced.

According to the embodiment, a release may be issued to an energy generator when at least one energy form requires the release of the energy generator. The release may then be withdrawn if no energy form requests the operation of the energy generator.

Fourth Embodiment

Figure 7:
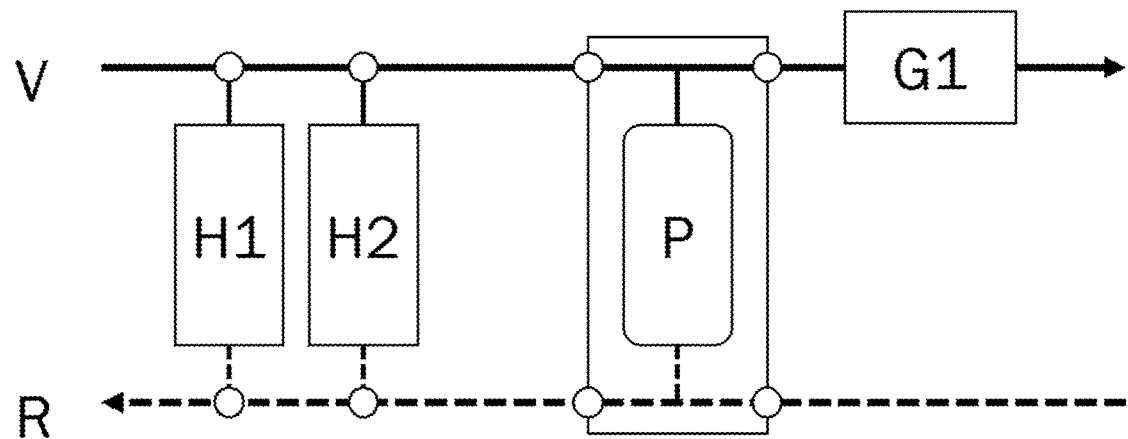
FIG. 7 is a hydraulic diagram of an energy supply system according to a fourth embodiment including two wood boilers and a gas boiler.

FIG. 7 shows a hydraulic diagram of an energy supply system according to a fourth exemplary embodiment. Similar to the third embodiment, the energy supply system includes a buffer storage P between the flow V and return flow R and a gas boiler G1 in the flow V downstream of the buffer storage P. A first wood boiler H1 and a second wood boiler H2 are each arranged in parallel to one another and in parallel to the buffer storage P upstream at the flow V1.

A control device S of the energy supply system according to the second embodiment is configured such that the wood boilers H1, H2 are preferably used, wherein the gas boiler G1 is to cover the peak load. As a result, the cheaper fuel wood is used for the base load (meeting a minimum energy request), while the inertia of the wood boiler H1, H2 is compensated by the use of a gas boiler G1 which can be quickly switched on and quickly switched off again. The gas boiler G1 may thus provide a peak load (meeting a maximum energy request).

Thus, by means of the control of the multivalent energy supply system which is adapted to the specific characteristics of the energy generator, a high quality of control may be achieved. An energy supply request in the form of a required system flow temperature at the transition to a consumer circuit (not shown) may thus be reached quickly and may then be maintained. This can be particularly advantageous if sensitive processes are connected on the consumer side (for example production machines).

As a further requirement for the control of the multivalent energy supply system it may be specified that a runtime equalization should take place between the wood boilers. In addition, the wood boilers H1, H2 are to be operated in the upper power range, where a particularly low-emission, i.e., clean, combustion may take place and the highest possible efficiency is achieved. This also allows for the longest possible operating period between maintenance operations to be achieved.

According to the prior art, usually a fixed switch-on and switch-off sequence is specified, in which no runtime equalization may take place. The first wood boiler H1 would then get much more operating hours than the second wood boiler H2. When a load changes (for example, by switching on or starting up the energy supply system after a standstill, such as after a maintenance or on a weekend), first the first wood boiler H1 is switched on. However, it takes a relatively long time until a sufficient amount of heat can be supplied to meet an energy supply request. Therefore in such a method, if the energy supply requirement is not met, first the second wood boiler H2 would be switched on (if necessary after a predetermined waiting time). Only after another waiting time could the gas boiler G1 also be switched on. The gas boiler G1 could supply the required amount of heat in a relatively short time. In such a method according to the prior art, it would take a relatively long time until the required amount of heat can be provided. In other words, the quality of control of the energy supply system would be severely limited in such a procedure. As a negative consequence, for example, production machines in the consumer circuit could go into operation only after a long time delay.

After a long warm-up period, the wood boilers H1, H2 supply heat (e.g., after one hour) and the system flow temperature rises, as more heat is produced than can be dissipated by the consumers or the buffer storage P. The flow temperature may rise above the required target value. Typically, the overshoot of the flow temperature above the target value is used as a criterion for switching off the gas boiler G1. This results in a corresponding poor quality of control, due to which heat-consuming production machines in the consumer circuit could possibly go out of operation. If the power consumed is less than the sum of the nominal power of both wood boilers H1, H2, the wood boilers H1, H2 are operated at unfavorable operating points (each at low power).

If the power consumed is less than the sum of the basic output of both wood boilers H1, H2, the second wood boiler is taken out of operation after a short time. A poor energy balance and negative effects on durability and maintenance intensity of the wood boiler H1, H2 are the result.

Figure 8:
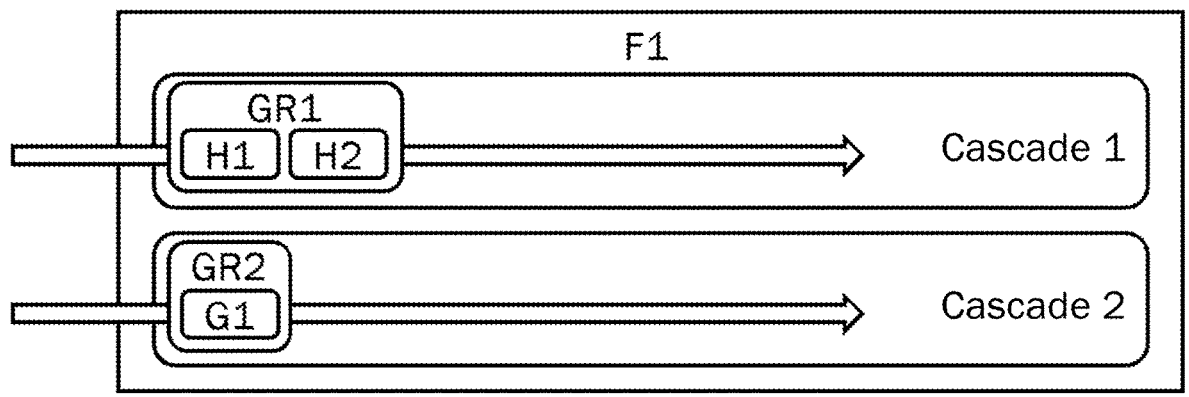
FIG. 8 shows a classification of the energy generators of the fourth embodiment into cascades and groups.

FIG. 8 shows how a sequence of switching on and/or off for the energy generators of the energy supply system of the fourth exemplary embodiment may be determined according to the invention. The wood boilers H1, H2 are combined in a group GR1, so that, as described above, a runtime equalization between the two similar energy generators H1, H2 may take place.

If one were to arrange the gas boiler G1 also in the first cascade 1, namely as the last energy generator, according to the sequential order in the cascade 1 it could be switched on only when the wood boilers H1, H2 are already in operation and the amount of energy required is not sufficient to meet the energy supply request EA. The well-controllable gas boiler G1 could therefore not be used to quickly meet peak loads, leading to a significantly degraded quality of control.

The wood boilers H1, H2 would be switched on and off similarly to the CHPs B1, B2 in the third embodiment. However, here the gas boiler G1 is arranged in a separate cascade 2 and may thus be operated based on a difference between an actual temperature and a target temperature measured at the system flow. Consequently, the gas boiler G1 may be operated independently of the switching state of the wood boilers H1, H2, so that an improved quality of control is achieved.

In order to prevent that the wood boilers H1, H2 are operated at unfavorable operating points at low power, although the power of only one of the wood boilers H1, H2 would be sufficient to cover the required power, this situation may be detected by evaluating the power balance within the group Gr1, A corresponding criterion for switching off the second wood boiler H2 can thereby be defined.

When switching on or starting up the energy supply system after a long period of standstill, the control device S recognizes that the energy supply request could be met by only one wood boiler H1. Thus, the second wood boiler H2 is not released by the control device S at all. However, since the wood boiler H1 takes a long time to be heated, the gas boiler G1 is switched on to supply the required amount of heat. As soon as the wood boiler H1 is sufficient to meet the demand, the gas boiler G1 is switched off again.

If the value of the required amount of energy drops so far that the flow temperature provided by the wood boiler H1 exceeds the required system flow temperature, the control device may temporarily store the heat supplied in the buffer storage P. If sufficient heat is present in the buffer storage P, then it may be used by the control device S to provide heat like an energy generator, as a result of which, in particular, rapidly occurring power fluctuations may be compensated.

Fifth Embodiment

Figure 9:
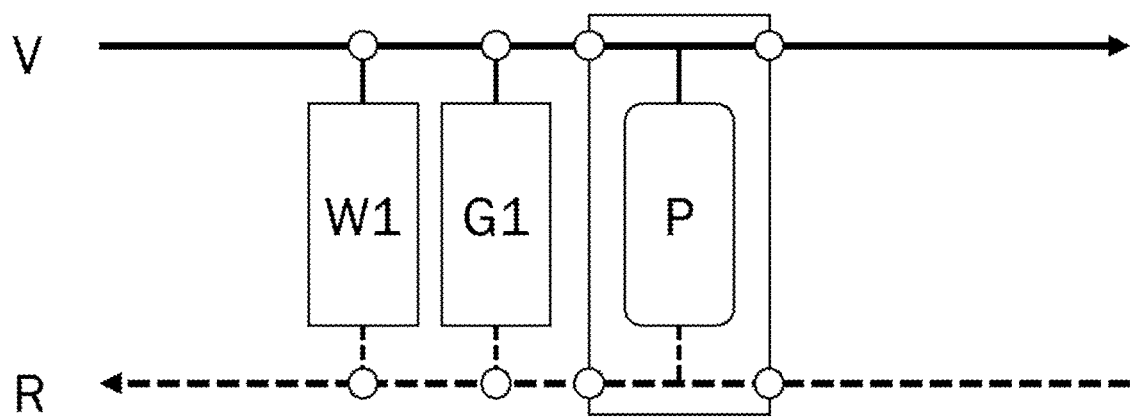
FIG. 9 is a hydraulic diagram of a multivalent energy supply system according to a fifth embodiment including a heat pump and a gas boiler.

FIG. 9 shows a hydraulic diagram of an energy supply system according to a fifth exemplary embodiment. A heat pump W1 and a gas boiler G1 are arranged in parallel to each other and in parallel to a buffer storage P between the flow V and return flow R.

The heat pump W1 should preferably be used to meet a minimum energy request. The gas boiler G1 as a peak load boiler is intended to only to cover the difference to the required amount of heat and thus meet a maximum energy request.

In order for the heat pump W1 to be used first, according to the prior art a fixed (sequential) switch-on and switch-off sequence must be predetermined. However, the heat pump W1 cannot go into operation if return flow temperature is too high. Due to the fixed switch-on sequence, however, the gas boiler G1 then cannot be put into operation. Thus, the required amount of heat cannot be delivered. This is an example of how a generator-specific criterion depending on a system parameter (return flow temperature) might prevent the energy generator from switching on, thus blocking the activation of further energy generators in a sequential switching sequence.

The solution to this problem according to the invention will be described with reference to FIG. 10. The heat pump W1 and the gas boiler G1 are each classified into separate cascades 1 and 2. This allows the two energy generators W1, G1 to be switched in parallel and independently of each other. In order for the heat pump W1 to be preferably used, the control device S determines the target value and switching specifications for meeting an energy supply request based on generator-specific criteria. In the present example, the generator-specific criteria relate to the type of energy generator and its dynamic characteristic. Thus, the control device S detects the restrictions of the energy generators which, for example, force a shutdown of the heat pump W1 at a too high return temperature and specify a certain waiting time between switching operations.

Figure 10:
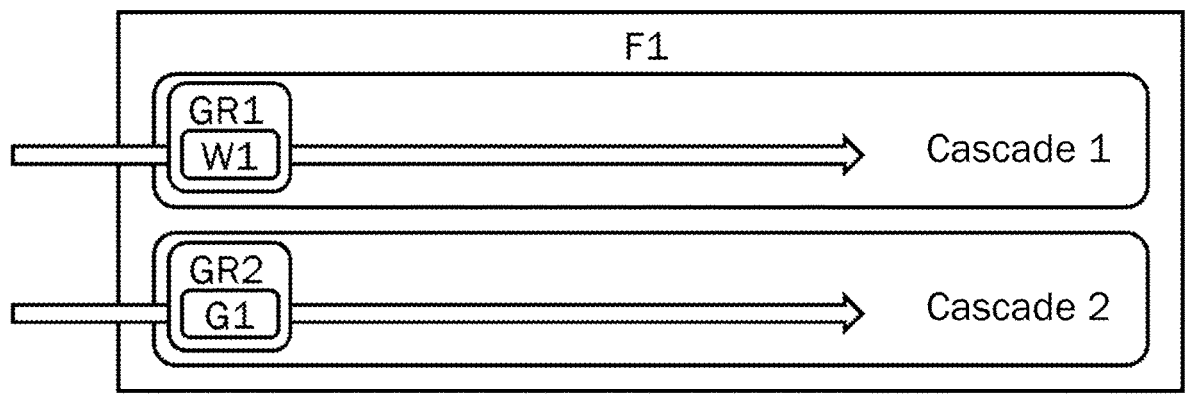
FIG. 10 shows a classification of the energy generators of the fifth embodiment into cascades and groups.

Unlike shown in FIG. 10, the heat pump W1 and the gas boiler G1 could also be placed together in a first cascade 1. If W1 would now be switched off when a defined temperature threshold value was exceeded, then the control device S would receive a restriction of W1 that W1 can no longer be switched on for a specific period. This would result in W1 being skipped in the switch-on order and the next energy generator, here the gas boiler G1, being able to be turned on if needed.

Sixth Embodiment

Figure 11:
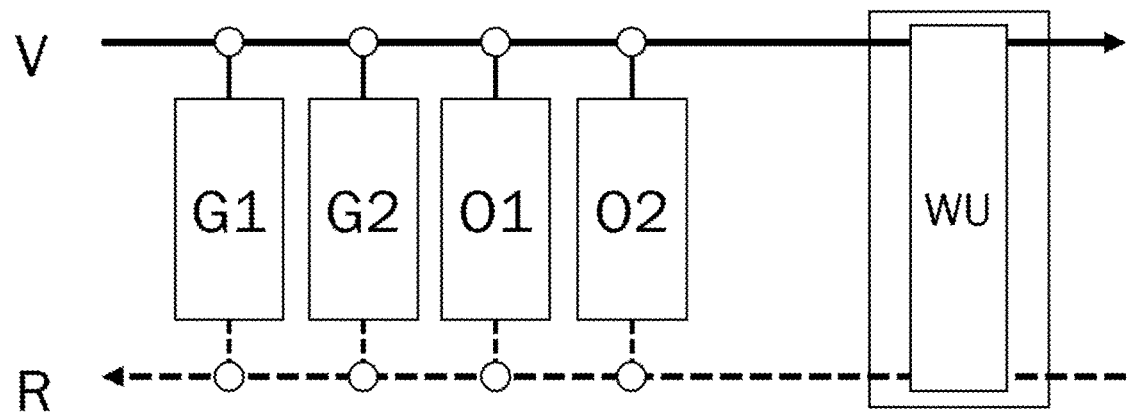
FIG. 11 shows a hydraulic diagram of a multivalent energy supply system according to a sixth exemplary embodiment including two oil boilers and two gas boilers.

In a sixth embodiment, the energy supply system comprises two gas boilers G1, G2 and two oil boilers O1, O2 which are all arranged in parallel to each other between flow V and return flow R. For the transfer of heat into a consumer circuit, heat transfer is provided. A hydraulic diagram of the energy supply system according to the fourth embodiment is shown in FIG. 11.

In controlling the energy supply system, the current energy costs and/or the availability of natural gas and heating oil should be taken into account. The energy carrier with the lower energy costs should preferably be used. In addition, a runtime equalization should take place between the boilers with the same type of fuel.

All boilers may be operated in just one cascade. In order to fulfill the task formulated above, the gas boilers G1, G2 and the oil boilers O1, O2 are each assigned to a separate group as shown in FIG. 12. Within each group, a runtime equalization takes place. Depending on the energy prices, the order of the groups is selected such that the group with the lower heat production costs is switched on first.

Seventh Embodiment

Figure 13:
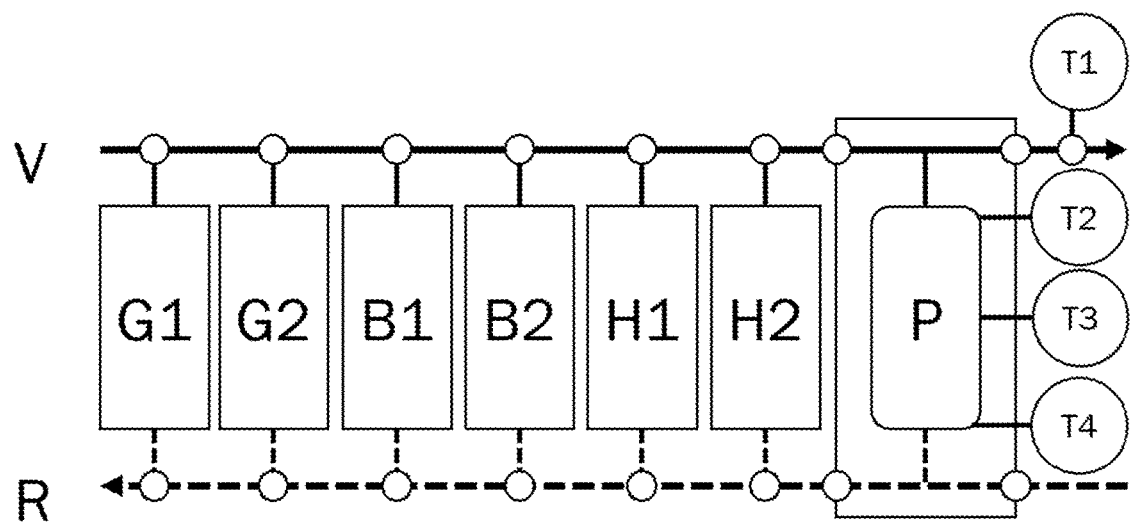
FIG. 13 is a hydraulic diagram of a multivalent energy supply system according to a seventh embodiment including two gas boilers, two CHPs and two wood boilers.

In the following, the control of a multivalent energy supply system by classifying the energy generators into groups and cascades will be explained again with reference to a seventh embodiment FIG. 13 shows a hydraulic diagram of the multivalent energy supply system according to a seventh exemplary embodiment. The multivalent energy supply system comprises two gas boilers G1, G2 which provide energy in the form of heat, two CHPs B1, B2 which provide energy in the form of heat and electric current, two wood boilers H1, H2 which provide energy in the form of heat, and a buffer storage P. In addition, a temperature sensor T1 is arranged in the flow V which measures the system flow temperature. In the buffer storage P three temperature sensors T2, T3, T4 are arranged, each measuring the temperature in the buffer storage P, respectively in an upper area, in a center area and in a lower area of the buffer storage. The gas boilers G1, G2 use natural gas from a gas supply as an energy carrier, CHPs B1, B2 use diesel from a fuel tank and the wood boilers H1, H2 use wood pellets from a wood pellet store which feeds the wood boilers H1, H2 with fuel via a conveyor means.

Each of the energy generators G1, G2, B1, B2, H1, H2 includes a closed-loop controller for controlling controlled variables of the respective energy generator G1, G2, B1, B2, H1, H2. These controlled variables include, inter alia, a heat output and a volume flow of a fluid carrier medium through the energy generators G1, G2, B1, B2, H1, H2, to which the heat is released. For controlling the volume flow, in the energy generators G1, G2, B1, B2, H1, H2 itself or in the lines (flow V and/or return flow R) connected to the energy generators G1, G2, B1, B2, H1, H2, valves and/or throttles and/or circulating pumps are arranged. In CHPs B1, B2, the controlled variables also include an output electric current or electric voltage.

The control of the energy supply system by a control device S for meeting a detected energy supply request EA which, for example, determines a required system flow temperature at the measuring point T1 or a buffer storage temperature at one of the three measuring points T2, T3, T4 of the buffer storage P, is performed based on the respective energy carriers gas, diesel and wood used by the energy generators G1, G2, B1, B2, H1, H2. Here, wood should be used as a preferred energy carrier. Furthermore, the CHPs B1, B2 should run in continuous operation as long as possible. In order to meet the energy supply request EA, the control device S determines target values SW for each of the energy generators G1, G2, B1, B2, H1, H2 and outputs them to the closed-loop controllers of the energy generators G1, G2, B1, B2, H1, H2. The target values SW may include specifications for controlled variables of the energy generators G1, G2, B1, B2, H1, H2 as well as instructions for switching on and/or switching off the energy generators G1, G2, B1, B2, H1, H2

The control device S detects an order of switching on and/or off the energy generators G1, G2, B1, B2, H1, H2. The order is determined by means of the classification of the energy generators G1, G2, B1, B2, H1, H2 into groups and cascades shown in FIG. 12. The two similar wood boilers H1, H2 are assigned to a common group GR1. As already described above, a runtime equalization may take place between the wood boilers H1, H2 in a group. In a corresponding manner, the two CHPs B1, B2 are assigned to the group GR2 and also operated with runtime equalization. The two gas boilers G1 and G2 are assigned to a group GR3. A runtime equalization may also take place between the gas boilers G1, G2.

Figure 14:
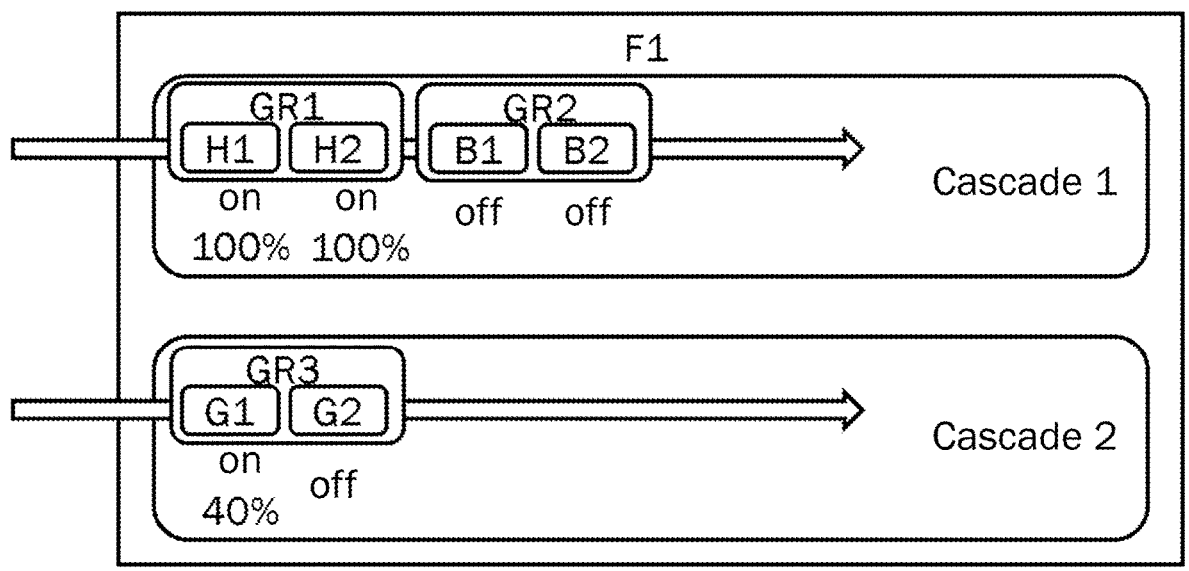
FIG. 14 shows a classification of the energy generators of the seventh embodiment into cascades and groups.

The wood boilers H1, H2 and the CHPs B1, B2 are classified as preferred energy generators, since their operation has advantages over the gas boilers G1, G2 with respect to the availability of the energy carriers used. In addition, electrical energy should be provided as continuously as possible in a first operation mode of the energy supply system. For this purpose, the groups GR1 and GR2 are assigned to a first cascade 1 as shown in FIG. 14. The order of the groups GR1 and GR2 within the group may be based on group-specific criteria. For example, the order may be determined according to current fuel costs, depending on scheduled maintenance measures, or made dependent on an energy supply request for electrical energy. In addition, other specific characteristics of the energy generators may also influence the order of the groups GR1, GR2 in the cascade 1.

The power output of wood boilers can be modulated only poorly. The two wood boilers H1, H2 of the embodiment may either be operated at maximum power or be switched off. As described above, the operations of switching on and off are dependent on the supply or consumption of the fuel wood in the combustion chamber and thus relatively time-consuming processes. The wood boilers H1, H2 react only very sluggishly to a change in the controlled variable and can either deliver no power (minimum value) or maximum power (maximum value). Due to these specific characteristics, the wood boilers are classified into the common group GR1.

If at least one of the wood boilers H1, H2 is in operation, it cannot be switched off until the charged fuel is completely burned. The closed-loop controller of the wood boiler then notifies the control device S that there is a restriction on the wood boiler H1 or H2 which specifies that the wood boiler must be switched on.

If, for example, one of the wood boilers H1, H2 has reached a maximum operating time and to be serviced, the control device S may detect the corresponding restriction that the wood H1 or H2 must be switched off.

Since the wood boilers H1, H2 are operated as continuously as possible due to their inertia, the group GR1 including the wood boilers H1, H2 is particularly well suited for providing a minimum energy request of the energy supply system in the form of heat. Alternatively, the group GR2 including the CHPs B1, B2 may be used to provide a minimum energy request of the energy supply system in the form of heat. The group GR2 may also simultaneously provide a minimum energy request of the energy supply system in the form of electrical energy. The control device S may select one of the two groups GR1 and GR2 for providing the minimum energy request based on the selected operation mode.

The gas boilers G1, G2 which are easily controllable in their power output and react quickly to changes in the controlled variable, are particularly suitable for providing a maximum energy request due to these specific characteristics. In particular, when the amount of heat provided by the wood boilers H1, H2 is insufficient to meet a maximum heat request, the gas boilers G1, G2 are switched on to meet the request.

The control device S of the energy supply system of the seventh embodiment may further include an energy generator detection device 14. This detects which energy forms the energy generators G1, G2, B1, B2, H1, H2 can each provide. If an energy supply request EA for simultaneously providing heat and electrical energy is detected by a request detection device 10, the energy generator detection device 14 determines that the CHPs B1, B2 can provide heat and electrical energy and forwards this information to a target value determination device 11 of the control device S. The target value determination device 11 then determines target values SW for the CHPs B1, B2 for providing heat and electrical energy dependent on the energy supply request EA. A target value output device 12 outputs the target values SW to the closed-loop controllers of the CHPs B1, B2 via a suitable communication interface.

FIG. 14 illustrates the classification of the energy generators of the seventh embodiment into groups and cascades. In addition, an example system state is shown in which the two wood boilers H1, H2 of the first group GR1 are both switched on and operate at full load. The two CHPs B1, B2 of the second group GR2 are switched off. The first gas boiler G1 is switched on and is operated in a modulating manner at a load of 40% of the maximum power.

The features disclosed in the foregoing description, the claims and the drawings may be of importance for the realization of the invention in its various forms both individually and in any combination.

LIST OF REFERENCE SYMBOLS

V flow
R return flow
S control device
P buffer storage
R1 first closed-loop controller
R2 second closed-loop controller
R3 third closed-loop controller
E1 first energy generator
E2 second energy generator
E3 third energy generator
E4 fourth energy generator
E5 fifth energy generator
E6 sixth energy generator
E7 seventh energy generator
E8 eighth energy generator
G1 first gas boiler
G2 second gas boiler
O1 first oil boiler
O2 second oil boiler
B1 first CHP
B2 second CHP
H1 first wood boiler
H2 second wood boiler
GR1 first group
GR2 second group
GR3 third group
GR4 fourth group
GR5 fifth group
F1 first energy form (heat)
F2 second energy form (electrical energy)
F3 third energy form (cold)

The invention claimed is:

1. A method of controlling a multivalent energy supply system, the multivalent energy supply system: including at least two energy generators (E1-E8, B1, B2, G1, G2, H1, H2, O1, O2, W1) which use at least two different energy carriers to provide energy in the form of heat (F1) and/or cold (F3) and/or electrical energy (F2), at least two closed-loop controllers (R1-R3) that each control a respective one of the energy generators (E1-E8, B1, B2, G1, G2, H1, H2, O1, O2, W1) and a control device (S) for coordinatedly controlling the closed-loop controllers (R1-R3), the method comprising the steps of:

detecting at least one energy supply request (EA) for at least one energy form of heat (F1) and/or cold (F3) and/or electrical energy (F2);

determining a classification of the energy generators (E1-E8, B1, B2, G1, G2, H1, H2, O1, O2, W1) into groups (GR1-GR5) according to a specific characteristic of the energy generators (E1-E8, B, B2, G1, G2, H1, H2, O1, O2, W1), wherein each energy generator (E1-E8, B1, B2, G1, G2, H1, H2, O1, O2, W1) is assigned to exactly one group (GR1-GR5) for each energy form (F1-F3) that it provides;

for each energy generator (E1-E8, B1, B2, G1, G2, H1, H2, O1, O2, W1), determining target values (SW) for meeting the at least one energy supply request depending on the classification of the energy generators (E1-E8, B1, B2, G1, G2, H1, H2, O1, O2, W1) into groups (GR1-GR5); and outputting the target values (SW) to the closed-loop controllers (R1-R3).

2. The method according to claim 1, further comprising the steps of:

in response to a group (GR1-GR5) including more than one energy generator (E1-E8, B1, B2, G1, G2, H1, H2, O1, O2, W1), acquiring current and/or historical controlled variables of the energy generator (E1-E8, B1, B2, G1, G2, H1, H2, O1, O2, W1) of the group (GR1-GR5) which describe a current operating state and/or a historical development of operating states;

determining an order of the energy generators (E1-E8, B1, B2, G1, G2, H1, H2, O1, O2, W1) within the group (GR1-GR5) according to the acquired controlled variables and/or a ratio of the controlled variables; and for each energy generator (E1-E8, B1, B2, G1, G2, H1, H2, O1, O2, W1), determining target values (SW) for meeting the at least one energy supply request based on the determined order of the energy generators (El-E8, B1, B2, G1, G2, H1, H2, O1, O2, W1) within the group (GR1-GR5).

3. The method according to claim 1, further comprising the steps of:

for each energy form (F1-F3)

classifying the groups (GR1-GR5) of energy generators (E1-E8, B1, B2, G1, G2, H1, H2, O1, O2, W1) into cascades based on at least one characteristic specific to the energy generators (E1-E8, B1, B2, G1, G2, H1, H2, O1, O2, W1) of the group, each group (GR1-GR5) being assigned to exactly one cascade;

in response to a cascade comprising more than one group (GR1-GR5), determining a sequential order of the groups (GR1-GR5) in the cascade; and for each energy generator (E1-E8, B1, B2, G1, G2, H1, H2, O1, O2, W1), determining target values (SW) for meeting the at least one energy supply request based on the determined classification of the groups (GR1-GR5) into cascades, wherein cascades are independently controllable.

4. The method according to claim 3, further comprising the steps of:

within each cascade, determining the order of the groups (GR1-GR5) of energy generators (E1-E8, B1, B2, G1, G2, H1, H2, O1, O2, W1) based on at least one of the following characteristics of the energy generators (E1-E8, B1, B2, G1, G2, H1, H2, O1, O2, W1): specific energy content of the respective energy carrier used, price of the respective energy carrier used, availability of the respective energy carrier used, time until a maintenance interval of the energy generator is reached (E1-E8, B1, B2, G1, G2, H1, H2, O1, O2, W1), physical arrangement of the respective energy generators (E1-E8, B1, B2, G1, G2, H1, H2, O1, O2, W1) in the multivalent energy supply system, or determining the order of the groups by a user; and for each energy generator (E1-E8, B1, B2, G1, G2, H1, H2, O1, O2, W1), determining target values (SW) for meeting the at least one energy supply request based on the determined order of the groups (GR1-GR5).

5. The method according to claim 1, wherein the specific characteristic of the energy generator (E1-E8, B1, B2, G1, G2, H1, H2, O1, O2, W1) is dependent on the type of energy carrier used by the energy generator (E1-E8, B1, B2, G1, G2, H1, H2, O1, O2, W1) and/or the physical arrangement of the energy generator (E1-E8, B1, B2, G1, G2, H1, H2, O1, O2, W1) in the multivalent energy supply system.

6. The method according to claim 1, wherein at least one energy generator (E1-E8, B1, B2, G1, G2, H1, H2, O1, O2, W1) is used to meet a minimum energy request.

7. The method according to claim 1, wherein at least one energy generator (E1-E8, B1, B2, G1, G2, H1, H2, O1, O2, W1) is used to meet a maximum energy request.

8. The method according to claim 1, further comprising the steps of:

detecting whether there is an energy supply request (EA) for providing heat (F1) and electrical energy (F2) present;

determining whether one of the energy generators (E1-E8, B1, B2, G1, G2, H1, H2, O1, O2, W1) can provide heat (F1) and electrical energy (F2); and determining target values (SW) for the energy generator (E1-E8, B1, B2, G1, G2, H1, H2, O1, O2, W1) for providing heat (F1) and electrical energy (F2) based on the energy supply request (EA).

9. A multivalent energy supply system, comprising:

at least two energy generators (E1-E8, B1, B2, G1, G2, H1, H2, O1, O2, W1) which use at least two different energy carriers to provide energy in the form of heat (F1) and/or cold (F3) and/or electrical energy (F2);

for each energy generator, a closed-loop controller (R1-R3) for controlling controlled variables of the energy generator (E1-E8, B1, B2, G1, G2, H1, H2, O1, O2, W1); and a control device (S), for coordinatedly controlling the closed-loop controllers (R1-R3), configured to detect at least one energy supply request (EA) for at least one energy form of heat (F1) and/or cold (F3) and/or electrical (F3); energy (F3), determine a classification of the energy generators (E1-E8, B1, B2, G1, G2, H1, H2, O1, O2, W1) into groups (GR1-GR5) according to a specific characteristic of the energy generators (E1-E8, B1, B2, G1, G2, H1, H2, O1, O2, W1), each energy generator (E1-E8, B1, B2, G1, G2, H1, H2, O1, O2, W1) being assigned to exactly one group (GR1-GR5), for each energy generator (E1-E8, B1, B2, G1, G2, H1, H2, O1, O2, W1), determine target values (SW) for meeting the at least one energy supply request based on the classification of the energy generators (E1-E8, B1, B2, G1, G2, H1, H2, O1, O2, W1) into groups (GR1-GR5), output the target values (SW) to the closed-loop controllers (R1-R3), classify the groups (GR1-GR5) of energy generators (E1-E8, B1, B2, G1, G2, H1, H2, O1, O2, W1) into independently controllable cascades based on at least one characteristic specific to the group of energy generators (E1-E8, B1, B2, G1, G2, H1, H2, O1, O2, W1), each group (GR1-GR5) being assigned to exactly one cascade, determine, in response to a cascade comprising more than one group (GR1-GR5), a sequential order of the groups (GR1-GR5) in the cascade, and for each energy generator (E1-E8, B1, B2, G1, G2, H1, H2, O1, O2, W1), determine target values (SW) for meeting the at least one energy supply request depending on the determined classification of the groups (GR1-GR5) into cascades.

* * * * *